United States Patent
Flannery et al.

[11] Patent Number: 6,135,487
[45] Date of Patent: Oct. 24, 2000

[54] BABY STROLLER WITH UNIQUE CURVED SWINGING LEGS AND UNIQUE TRIGGER TO INITIATE SWINGING

[75] Inventors: Mark A. Flannery, Shorewood; Timothy L. Edwards, Minneapolis, both of Minn.; Danial E. Julian, Indianapolis, Ind.

[73] Assignee: Regalo International, LLC, Minneapolis, Minn.

[21] Appl. No.: 09/158,878

[22] Filed: Sep. 23, 1998

[51] Int. Cl.[7] .......................................................... B62B 7/06
[52] U.S. Cl. ............................ 280/642; 280/650; 297/48; 297/16.2; 403/101; 403/163
[58] Field of Search ..................................... 280/642, 647, 280/650, 47.34, 47.4, 644, 658; 403/101, 163; 297/16.2, 46, 47, 48

[56] References Cited

U.S. PATENT DOCUMENTS

| | | |
|---|---|---|
| D. 356,528 | 3/1995 | Liu . |
| D. 365,784 | 1/1996 | Wennerstrom et al. . |
| D. 382,516 | 8/1997 | Hutchinson et al. . |
| D. 382,837 | 8/1997 | Haut et al. . |
| D. 402,234 | 12/1998 | Julien et al. . |
| D. 419,493 | 1/2000 | Flannery et al. . |
| 5,388,853 | 2/1995 | Lauro ........................................ 280/642 |
| 5,427,402 | 6/1995 | Huang . |
| 5,454,584 | 10/1995 | Haut ........................................ 280/642 |
| 5,622,376 | 4/1997 | Shamie ..................................... 280/642 |
| 5,645,293 | 7/1997 | Cheng ...................................... 280/642 |
| 5,725,238 | 3/1998 | Huang . |
| 5,979,928 | 11/1999 | Kuo ......................................... 280/642 |

Primary Examiner—Michael Mar

[57] ABSTRACT

A foldable baby stroller having a set of legs and a handle which are swingable relative to each other between operating and collapsed configurations. In the operating configuration, the front legs and handle lie generally on the same arc to provide a smooth transition from the legs to the handle. The rear legs are preferably curved as well. In the collapsed configuration, the front legs lie generally parallel to the rear legs. A stabilizing side section runs on each side of the stroller between respective front and rear legs. The stabilizing side section is swingably affixed to its respective front leg at a position closer to the handle than the wheels and is swingably affixed to its respective rear leg at a position closer to the wheel than the handle to provide for a stable baby stroller in the operating configuration and a baby stroller that is readily collapsible. A trigger for releasing a connection between the legs and the handle is oriented so that an upward pressure releases the connection and permits the handle to swing downwardly and the front legs to swing rearwardly when the trigger is squeezed. This upward pressure or squeezing is in the same direction along which the stroller is commonly lifted so that the stroller can be lifted and the trigger released by pressure being applied at the same location.

16 Claims, 5 Drawing Sheets

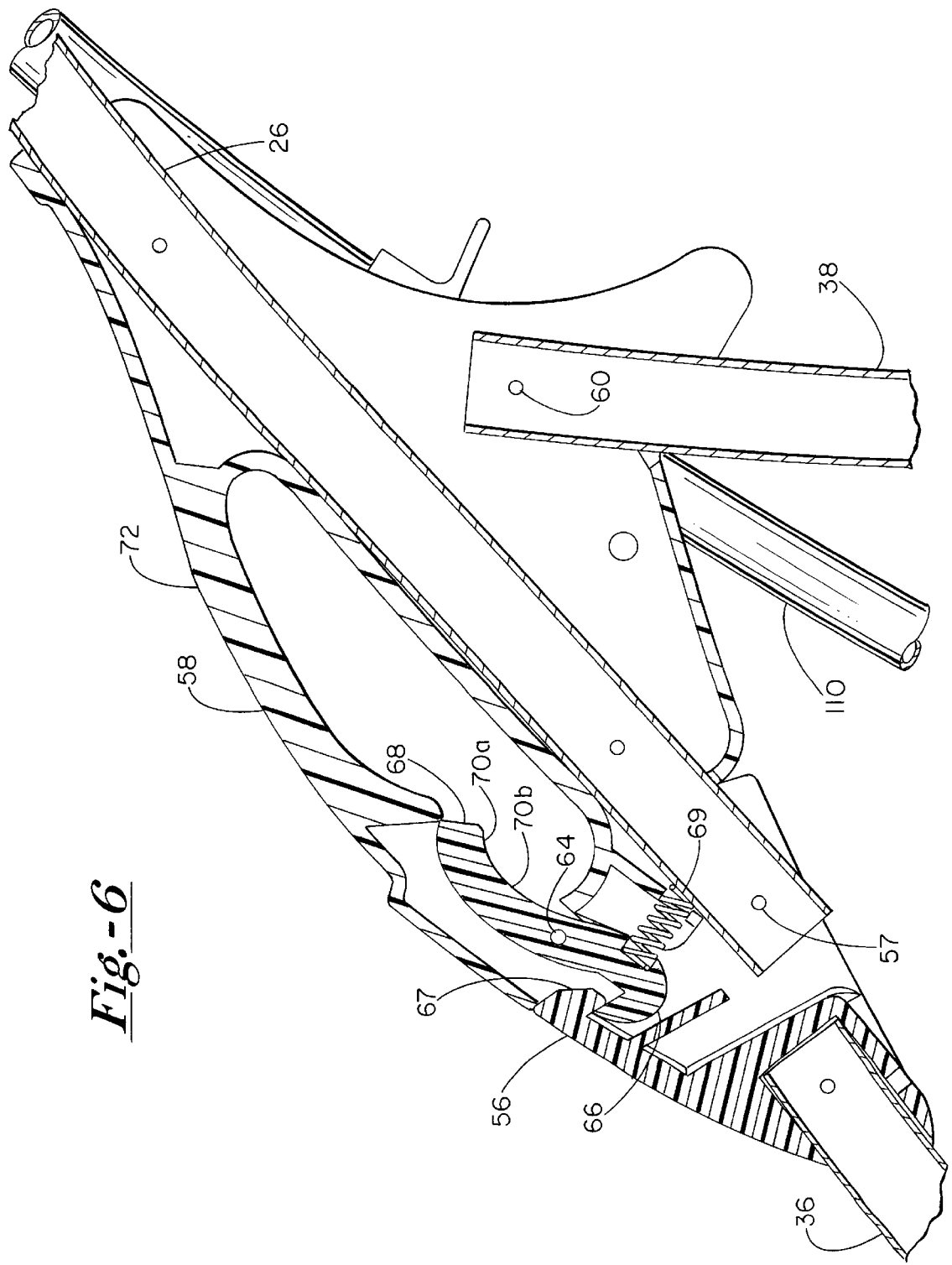

BABY STROLLER WITH UNIQUE CURVED SWINGING LEGS AND UNIQUE TRIGGER TO INITIATE SWINGING

BACKGROUND OF THE INVENTION

The present invention relates generally to baby strollers, particularly to baby strollers that are collapsible to a stored, compact configuration, and specifically to such baby strollers having a curved frame.

Safety sells. Watch a mom-to-be in a baby store walk from car seat to car seat, clipping and unclipping the buckles of the different infant seats, or from crib to crib or from playyard to playyard shaking the various apparatus, or from baby stroller to baby stroller picking up the strollers and banging them against the floor.

A foldable apparatus sells. With both parents working, infants and toddlers may have a number of caregivers. The crib or playyard, or baby swing or stroller no longer remains only at home. If the baby product takes up less space in a minivan or car, the product is more likely to sell.

A baby product that is aesthetically pleasing sells. Why? Because babies are precious.

A baby product that is safe, foldable to a compact configuration, and appealing to the eye is an ideal combination. Attaining such an objective, however, is problematic. For example, prospective features that may provide for a collapsing of the product into a compact configuration may sacrifice safety and thus must be discarded. Or prospective features that would enhance the aesthetics of the product may sacrifice collapsibility.

SUMMARY OF THE INVENTION

A feature of the present invention is the provision in a foldable baby stroller, of curved front legs, curved rear legs, and a curved handle, each of which curve in the same direction.

Another feature of the present invention is the provision in such a foldable baby stroller, of the curved legs running along a segment of an arc. Such a circular segment, or a segment that is generally perceived as an arc or portion of a circle, is considered to be aesthetically pleasing.

Another feature of the present invention is the provision in a foldable baby stroller, of a pair of elongate handle frame sections that curve to form an arc or segment of a circle.

Another feature of the present invention is the provision in such a foldable baby stroller, of an alignment of each of the elongate handle frame sections with one of the front legs such that the arcs of each of the sections is aligned with the arcs of the front legs to provide the perception of a continuous arc from the wheels to the proximal end of the handle portion of the frame where the baby stroller is pushed.

Another feature of the present invention is the provision in such a foldable baby stroller, of a handle frame portion, a pair of front legs swingably engaged to the handle frame portion, a pair of rear legs swingably engaged to the handle frame portion, and a pair of stabilizing side frame portions running to and between front and rear legs and swingably engaged to the front and rear legs. The stabilizing frame portion is swingably engaged at unique locations to the front and rear legs, specifically to the front leg at a location closer to the handle frame portion than to the wheels of the front legs and to the rear leg at a location closer to the wheel than the handle portion.

Another feature of the present invention is the provision in such a foldable baby stroller, of a collapsed configuration where the front legs and rear legs lie generally parallel to one another.

Another feature of the present invention is the provision in such a foldable baby stroller, of a baby seat frame portion being swingably engaged to the stabalizing side frame portions.

Another feature of the present invention is the provision in such a foldable baby stroller, of the baby seat frame being formed at least partially by the stabilizing side frame portions.

Another feature of the present invention is the provision in such a foldable baby stroller, of a trigger release mechanism that is squeezable in a generally upward direction to release a lock between the handle frame portion and the front and rear legs. To collapse the stroller, the stroller may be lifted slightly off the ground, the trigger is squeezed, and the handle frame portion and front legs naturally swing downwardly under the influence of gravity to confront each other and the rear legs. Since the collapsing of the portions of the baby stroller frame occurs automatically by gravity as the baby stroller is lifted, it is preferred that the trigger be oriented such that pressure to activate the trigger be applied in the upward direction, the direction in which the baby stroller is lifted so that, after release of the lock, the frame portions of the stroller naturally collapse.

Another feature of the present invention is the provision, in such a trigger mechanism, of a rounded surface for the trigger mechanism such that an upward force may s be applied to the trigger during the folding process when the orientation or angle of the stroller as a whole changes as to the vertical direction.

An advantage of the present invention is that it is safe. One feature that contributes to this advantage is the stabilizing side frame portion.

Another advantage of the present invention is that it is readily collapsible. The trigger is designed to release when an upward pressure is applied. This upward pressure is generally in the same direction as the motion used when one lifts the baby strollers to take the legs off the ground to permit the legs to collapse. In other words, when the baby stroller is lifted immediately at the trigger by placing one's forefingers on the respective triggers and lifting up, the lock is released and the collapsible swinging of the frame portions occur almost simultaneously.

Another advantage of the present invention is that the lines of the frame are aesthetically pleasing. The arc of the front leg runs into the arc of the handle. Even the arc of rear leg provides a pleasing transition up and into the arc of the handle.

Another advantage of the present invention is that the collapsed configuration is compact. In the collapsed orientation, the baby stroller takes up a minimum of space. One feature contributing to this advantage is the general parallel orientation of the front and rear legs.

Another advantage of the present invention is that the baby stroller is simple and inexpensive to manufacture.

These and further objects and advantages of the present invention will become clearer in light of the following detailed description of the illustrative embodiments of this invention described in connection with the drawings.

BRIEF DESCRIPTION OF THE DRAWINGS

FIG. 6 is a section view of the trigger mechanism and the portion of the baby stroller frame about the trigger mechanism.

DESCRIPTION

Figure 1:
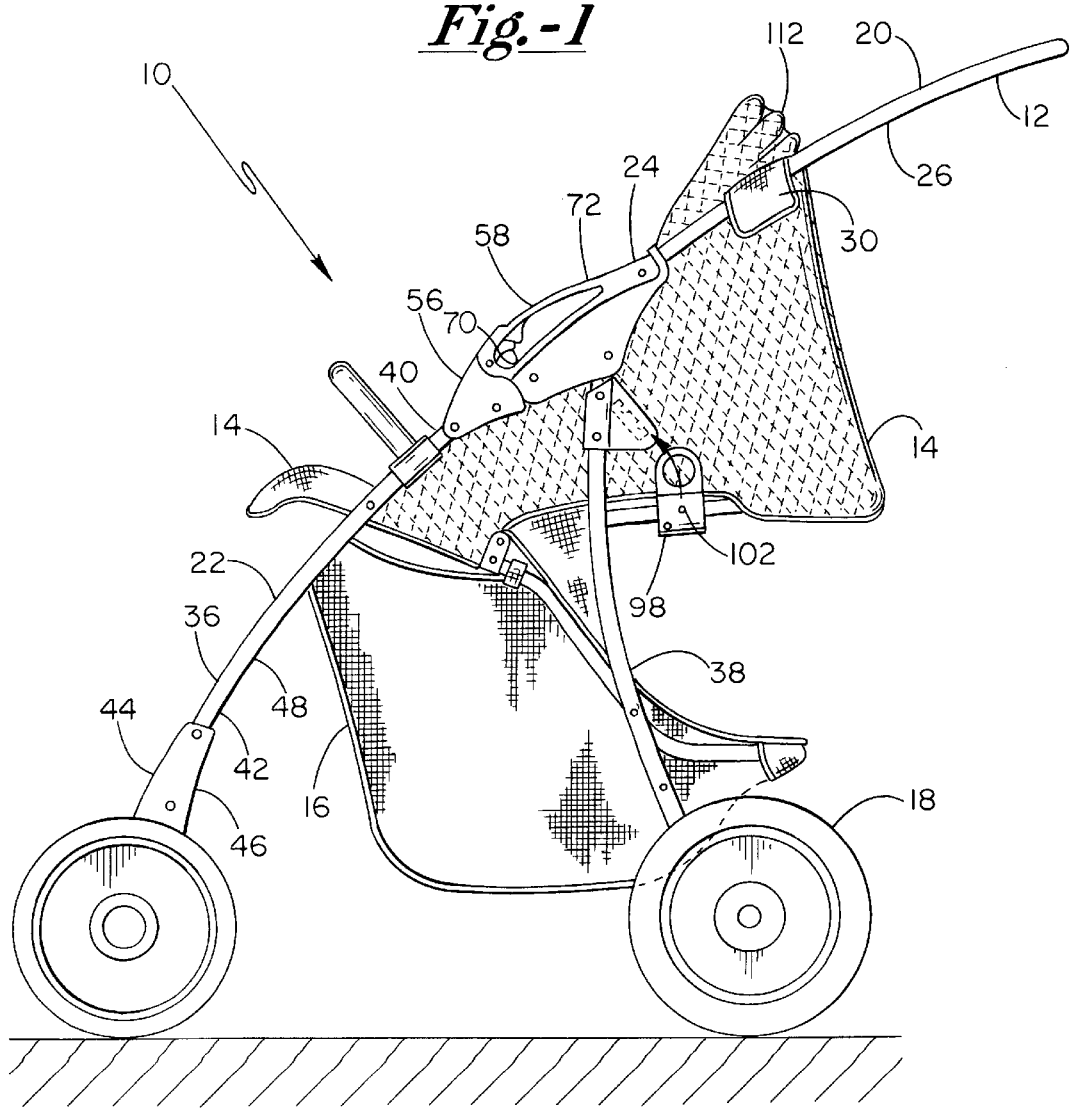
FIG. 1 shows a side view of the present baby stroller fully dressed with at least a seat and a storage basket.
Figure 2:
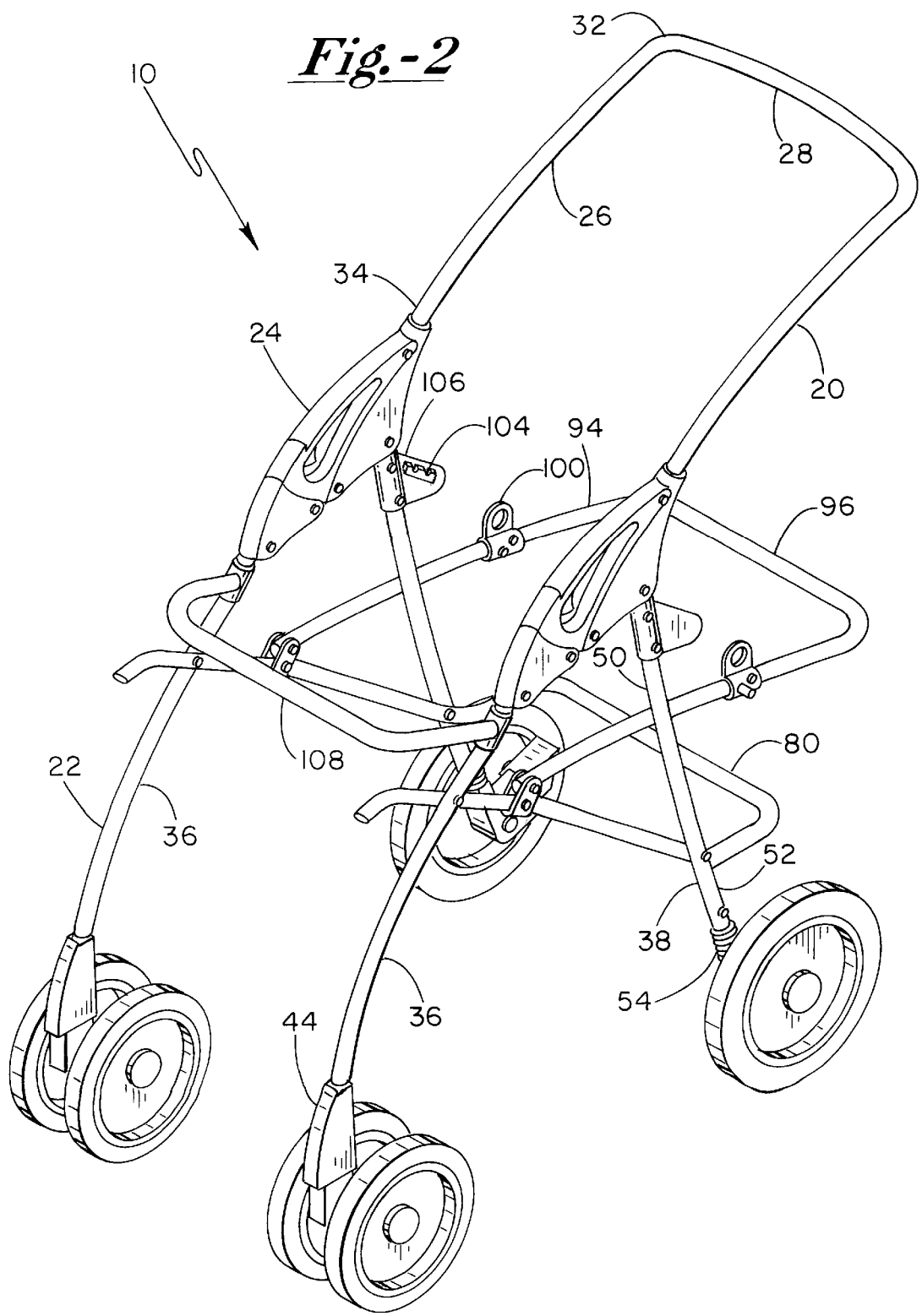
FIG. 2 shows a perspective view of the frame of the baby stroller of FIG. 1.

As shown in FIG. 1, the present baby stroller is indicated in general by the reference numeral 10. The baby stroller 10 includes a frame 12, a baby seat enclosure 14, a storage basket 16, and wheels or rollers 18. Frame 12 includes a handle portion 20, a leg portion 22, and a pair of connectors 24 between the handle portion 20 and leg portion 22.

Handle portion 20 is tubular and is generally U-shaped. Handle portion 20 includes a pair of elongate tubular side handle sections 26 and a tubular transversely extending hand gripping section 28 for pushing the stroller 10. Side handle sections 26 are rigidly fixed in and extend from respective connectors 24. Each of the side handle sections 26 passes under a fabric piece 30 stitched to the seat enclosure 14. Fabric piece 30 keeps the seat enclosure 14 in a generally upright position and permits a relative sliding between the seat enclosure 14 and the side handle sections 26. Each of the side handle sections 26 includes a proximal end 32 and a distal end 34 and curves in one direction from the proximal end 32 to the distal end 34. Preferably, such a curve is a segment of a circle.

Leg portion 22 of the frame 12 includes a pair of front tubular legs 36 and a pair of rear tubular legs 38. Each of the front legs 36 includes a proximal end portion 40 which is rigidly fixed to connector 24 and a distal end portion 42 which is rigidly fixed to a bushing or bearing structure 44 for one of the front rollers 18. Each of the front legs 36 curves in one direction from the proximal end portion 40 to the distal end portion 42. Preferably, such a curve is a segment of a circle and, more preferably, the curve of each of the front legs 36 is aligned with the curve of one respective side handle section 26 so as to form a smooth transition from the front legs 36 to the side handle sections 26. In other words, it is preferred that the curve of each of the front legs 36 falls on the same arc or arc segment as the curve of its respective side handle section 26. Bearing or bushing structure 44 includes a rear edge 46 that further falls on the same arc so as to be generally aligned with a rear edge 48 of it respective front leg 36. Bearing or bushing structure 44 includes a bushing or bearing mechanism for receiving and supporting an axle for the wheels or rollers 18.

Each of the rear legs 38 includes a proximal end portion 50 which is rigidly fixed to connector 24 and a distal end portion 52 which is rigidly fixed to a bushing or bearing structure 54 for one of the rear rollers 18. Each of the rear legs 38 curves in one direction from the proximal end portion 50 to the distal end portion 52. Preferably, such a curve is a segment of a circle. Bearing or bushing structure 54 includes a bushing or bearing mechanism for receiving and supporting an axle for the wheels or rollers 18.

The connector 24 is generally two-piece. A first connector piece 56 rigidly engages its respective front leg 36 and swingably engages its respective side handle section 26 of the handle portion 20 via a pivot pin 57 such that the front legs 36 are swingable relative to the handle portion 20 of the frame 12. A second piece 58 rigidly receives its respective side handle section 26 of the handle portion 20 and swingably engages its respective rear leg 38 via a pivot pin 60 such that the rear legs 38 are swingable relative to the handle portion 20 of the frame 12 and such that the front and rear legs 36, 38 are swingable relative to each other.

Connector pieces 56 and 58 are affixed to each other via side handle section 26 running through connector piece 58. Such an engagement is a swingable engagement via pivot pin 57. Connector pieces 56 and 58 are lockable to each other via a spring biased lever lock 62. Lever lock 62 is pivotally affixed to connector piece 58 via a pivot pin 64. Lever lock 62 includes a hook end 66 and a trigger end or trigger 68. Hook end 66 engages a catch 67 formed in connector piece 56. Hook end 66 includes a coil spring 69 to bias the trigger end 68 in generally a downwardly direction and so as to bias the hook end 66 up and into engagement with the catch formed in connector piece 56. Coil spring 69 is engaged between hook end 66 and a portion of connector piece 58. When the trigger 68 is squeezed, such an action compresses the coil spring 69 and releases the hook end 66 from its respective catch 67 and releases the connector pieces 56 and 58 from each other, thereby permitting the front legs 36 to swing relative to the side handle sections 26 of the handle portion 20. Trigger 68 is preferably adjacent to pivot pin 57, the pivot point between the leg portion 22 of the frame 12 and the handle portion 20 of the frame 12.

Trigger 68 is preferably oriented such that pressure applied generally upwardly against it releases the connector pieces 56, 58 and initiates folding of the frame 12. As can be seen by comparing FIGS. 3 and 4, this upward direction is almost directly vertical shortly after the folding has begun. This upward squeeze or pressure is along the same general vector as is followed when the baby stroller 10 is lifted off the ground, as shown in FIG. 4. When the baby stroller 10 is so lifted, the handle portion 20 naturally swings downwardly and forwardly under the influence of gravity and the front legs 36 naturally swing downwardly and rearwardly under the influence of gravity.

Figure 3:
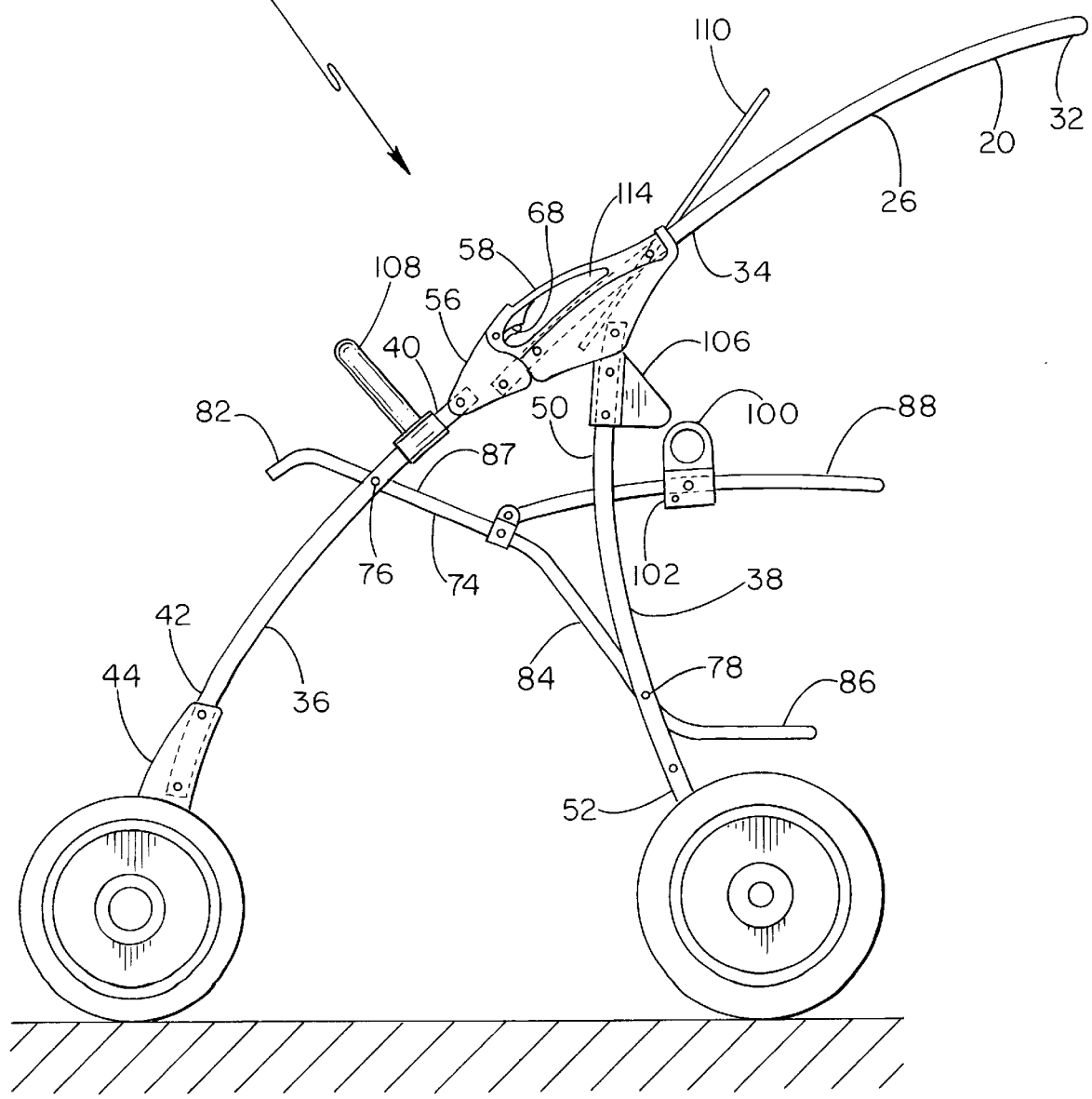
FIG. 3 shows a side view of the frame of the baby stroller of FIG. 1 in its fully operational configuration.
Figure 4:
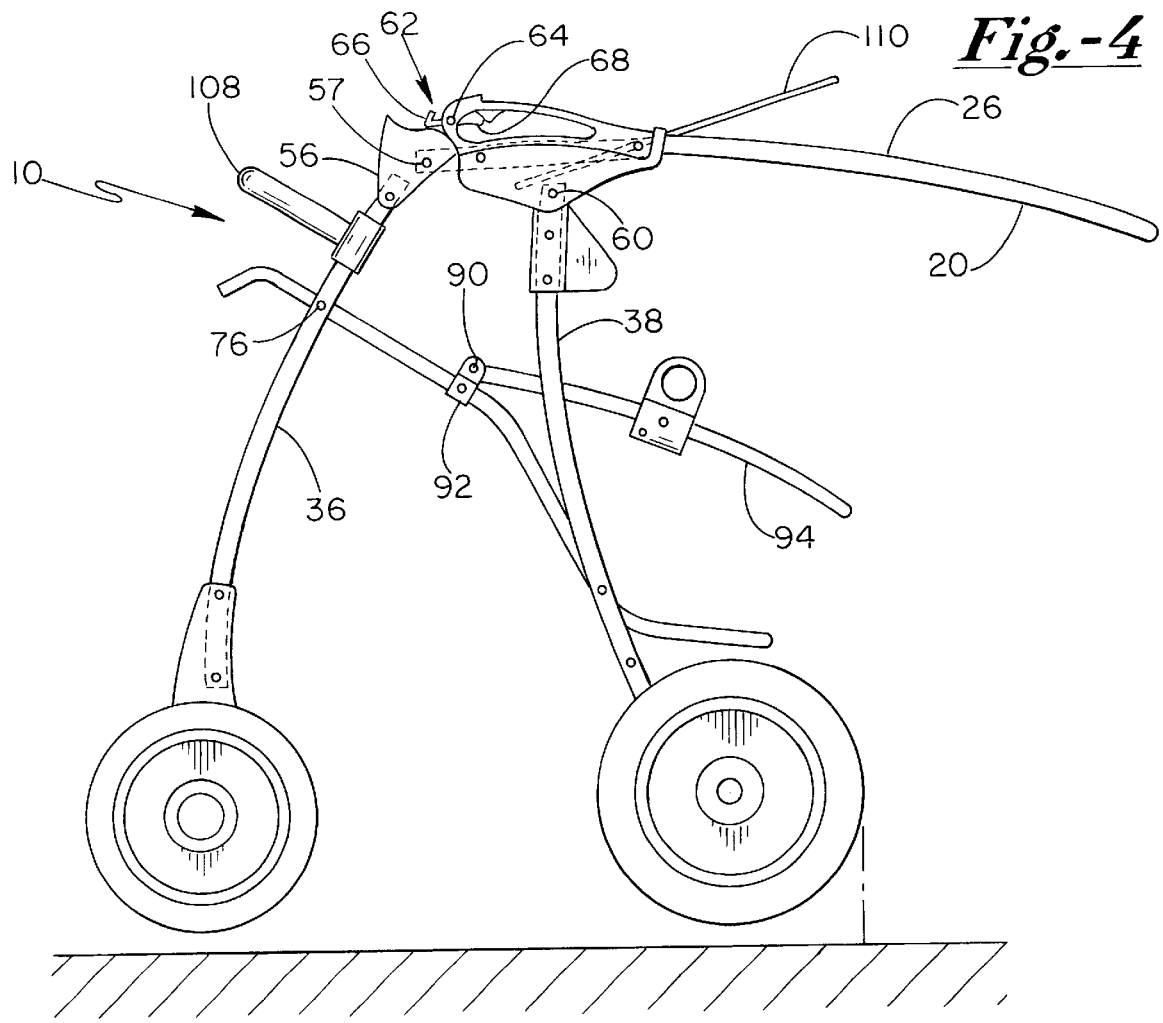
FIG. 4 shows a side view of the frame of the baby stroller of FIG. 1 in a partially collapsed configuration such as when it is being lifted.

As can be noted in FIGS. 1 and 3, a bottom surface 70 of the trigger 68 is disposed at about a 45 degree angle relative to the floor. After the trigger 68 is activated, the general angle of the surface 70 increases slightly temporarily until the hook end 66 releases its catch and the front legs 36 swing rearwardly and the handle portion 20 swings frontwardly. When such occurs, preferably by the baby stroller is being lifted via the hand grip portion 72 of connector piece 58, the angle of this trigger surface 70 decreases back to and through the 45 degree angle and further decreases to the horizontal, as shown in FIG. 4. As the baby stroller 10 is still further lifted and as the front legs 36 and handle portion 20 continue to swing relative to each other, the handle portion 20, hand grip 72, and trigger surface 70 may remain generally in a horizontal position, which is shown by a comparison between FIGS. 4 and 5.

Figure 5:
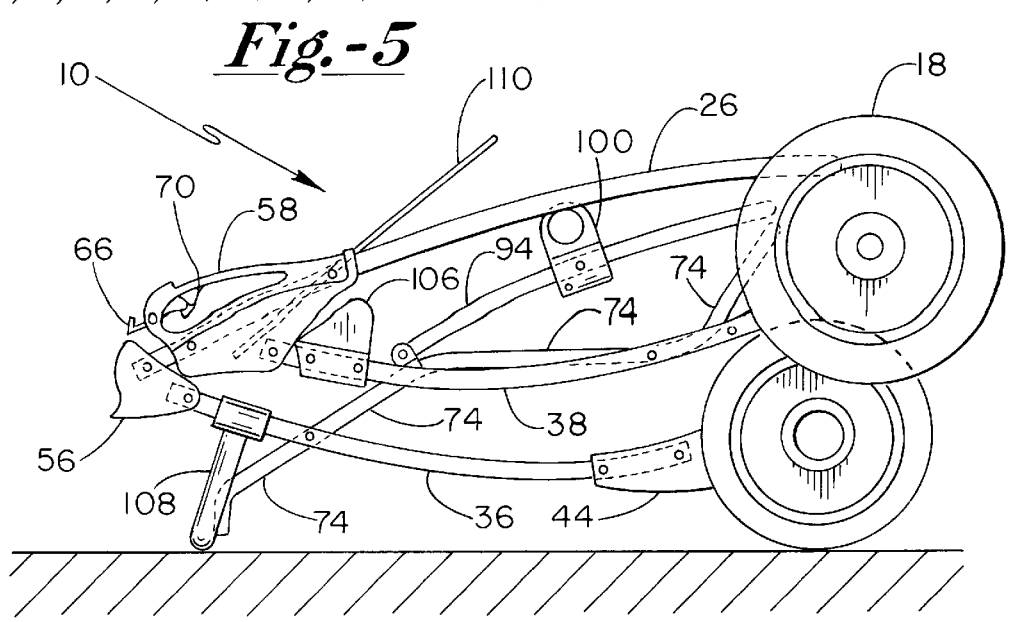
FIG. 5 shows a side view of the frame of the baby stroller of FIG. 1 in a fully collapsed or folded configuration.

The detail view of FIG. 6 shows that the trigger surface 70 is rounded so that at least a trigger surface portion 70a (or the slope at a point on portion 70a) is generally horizontal when the trigger 68 is initially depressed and so that another trigger surface portion 70b (or the slope at a point on portion 70b) comes into the horizontal as folding continues and moves to and through the folding position shown in FIG. 4 and to the folded position shown in FIG. 5. Trigger surface 70 is an under surface that is inwardly rounded. Hence an upward squeezing pressure, in the same upward direction that initiates folding of the stroller 10, opens the trigger 68 and keeps such open throughout the lifting and folding of the stroller 10.

To unfold the baby stroller 10 from the collapsed configuration shown in FIG. 5 to the operating configuration shown in FIG. 3, the baby stroller 10 is lifted by the hand grips 72 without depressing the triggers 68, and the front legs 36 and rear legs 38 naturally swing forwardly under the influence of gravity. The handle portion 20 is raised to an angle from the horizontal, and the catch in connector piece 56 slides over and into hook end 66 to fix the baby stroller 10 in its operating configuration.

For the purposes herein, a general upward direction, such as for lifting the stroller 10 is an upward direction greater than 45 degrees, with 90 degrees being the direction immediately vertical. For activation of the trigger 68, such an upward direction is also a direction greater than 45 degrees. Accordingly, it is preferred that the trigger surface 70 be disposed at an angle of 45 degrees or less, with the trigger surface 70 when disposed at zero degrees defining a trigger surface 70 which is horizontally disposed so that a squeezing action is directly vertical.

The leg portion 22 of the frame 12 includes leg stabilizing side tubular sections 74. Each of the leg stabilizing sections 74 runs to and between a side pair of front and rear legs 36, 38. Each of the leg stabilizing sections 74 is swingably engaged to its respective front leg 36 via a pivot pin 76 at a position closer to the proximal end portion 40 than the distal end portion 42. Each of the leg stabilizing sections 74 is swingably engaged to its respective rear leg 38 via a pivot pin 78 at a position closer to the distal end portion 52 than the proximal end portion 50. Leg stabilizing sections 74 are integral with each other via a transversely extending tubular section 80. When viewed from a vertical position, leg stabilizing sections 74 and transverse section 80 form a general U-shaped piece. Such a U-shaped piece with its leg stabilizing sections 74 aid in keeping the front and rear legs 36 and 38 stable relative to each other.

Each of the leg stabilizing sections 74 includes a front end 82 which is bent ergonomically downwardly for the legs of a baby sitting in the seat enclosure 14. Each of the leg stabilizing sections 74 further includes a rearwardly located downwardly bent portion 84 that runs into a horizontally disposed rear end portion 86 disposed over the wheels 18. Storage basket or flexible receptacle 16 depends from and engages the downwardly bent portion 84 and further depends from and engages the transversely extending section 80. Seat enclosure 14 engages portions 87 of the leg stabilizing sections 74 running forwardly of the downward bent portion 84. These portions 87 of the leg stabilizing sections 74 form a seat frame for the seat enclosure 14 of the baby stroller 10.

The leg portion 22 of the frame 12 further includes a seat back portion 88. Seat back portion 88 is tubular and is generally U-shaped. Seat back portion 88 is swingably engaged to leg stabilizing sections 74 via respective bracketed pivot pins 90. Each of the pins 90 is engaged in a respective bracket 92 rigidly fixed to a medial portion of one respective leg stabilizing section 74. U-shaped seat back portion 88 includes elongate side sections 94 and a transversely extending section 96. Transversely extending section 96 serves as a hand grip to swing the seat back portion 88 up and down. Each of the elongate side sections 94 includes an upwardly extending piece 98 having a finger grip 100 and a set of two pegs 102 extending transversely outwardly. Pegs 102 catch on notches 104 formed in a piece 106 rigidly engaged on proximal end 50 of each of the rear legs 38 to dispose the seat back portion 88 at different angles for sitting or sleeping.

A baby safety bar 108 extends to and between the proximal end portions 40 of the front legs 36. Baby safety bar 108 is generally U-shaped.

A U-shaped canopy bar 110 is pivotally fixed between side handle sections 26. The U-shaped canopy bar 110 is engaged to a canopy portion 112 (shown in FIG. 1). Canopy portion 112 is integral with and forms a portion of the seat enclosure 14. Canopy portion 112 may be drawn out accordion like to provide shade for an infant in the seat enclosure 14.

In the collapsed configuration shown in FIG. 5, front legs 36 have swung relative to the handle frame portion 20 and has further swung relative to the rear legs 38 such that the front legs 36 confront both the handle portion 20 and the rear legs 38. The rear legs 38 have swung relative to the handle portion 20 and front legs 36. Both the front legs 36 and rear legs 38 confront each other and further confront the handle portion 20 of the frame 12. Seat backing portion 88 has swung relative to the leg stabilizing sections 74 so as to confront the leg stabilizing sections 74. Leg stabilizing sections 74 have swung relative to each of their respective front legs 36 and rear legs 38 so as to confront the front and rear legs 38. In general, each of the handle portion 20, front legs 36, rear legs 38, leg stabilizing sections 74, and seat backing elongate side sections 94 confront each other such that the baby stroller 10 is compact for storage. Preferably, the front legs 36 are generally parallel to the rear legs 38 in the collapsed configuration shown in FIG. 5.

It should be noted that the connector piece 58 includes an elongate slot 114 extending transversely therethrough and further extending in the direction of handle section 26. Trigger 68 is located in a portion of hand slot 114 that is proximal to the leg portion 20 of the frame 12 such that the trigger 68 is ergonomically located when a hand is in the slot 114. Hand slot 114 is of sufficient size for the reception of a hand of an adult.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A foldable baby stroller, comprising, in combination:
   a) a frame comprising a leg portion and a handle portion;
   b) wherein the leg portion of the frame comprises a pair of front legs and a pair of rear legs, with each of the legs comprising a proximal end portion and a distal end portion, with each of the legs further comprising a roller engaged to said distal end portion;
   c) wherein the leg portion of the frame and handle portion of the frame are swingable relative to each other, with the frame having an operating configuration where the leg portion of the frame and the handle portion of the frame are swung apart, with the frame having a collapsed configuration where the leg portion of the frame and handle portion of the frame are swung to confront each other;
   d) wherein the handle portion of the frame comprises a pair of side elongate sections and a transversely extending gripping section extending between the side elongate sections, with each of the side elongate sections comprising a segment of a curve, with each of the segments curving in one direction;
   e) wherein each of the legs from their respective distal end portions to their respective proximal end portions comprises a segment of a curve, with said segment curving in one direction;

f) wherein the curves of the front legs lead into the curves of the side elongate sections to provide a smooth transition from the leg portion of the frame to the handle portion of the frame and to provide a sleek look to the baby stroller;

g) wherein the leg portion of the frame further comprises a pair of stabilizing side sections, with each of the stabilizing side sections running on one side of the frame between respective front and rear legs, with said stabilizing side section being swingably engaged to said front leg at a position closer to the proximal end portion of said front leg than the distal end portion of said front leg, with the stabilizing side section being swingably engaged to said rear leg at a position closer to the distal end portion of said rear leg than the proximal end portion of said rear leg whereby the leg portion of the frame is relatively stable and whereby the baby stroller is foldable; and h) wherein the frame further comprises a pair of seat support portions with each of the seat support portions being swingably engaged to one of the stabilizing side sections at a position between the front and rear legs.

2. The baby stroller according to claim 1, wherein the segments of the front legs and the segments of the side elongate portions are arc segments and fall on the same arc.

3. The baby stroller according to claim 1, wherein each of the rear legs includes an arc segment running from their respective distal end portions to their respective proximal end portions.

4. The baby stroller according to claim 1 wherein, when the frame is swung into the collapsed configuration, the front and rear legs lie generally parallel to each other.

5. The baby stroller according to claim 1 and further comprising a flexible receptacle, with the flexible receptacle being engaged to and depending from the stabilizing side section.

6. The baby stroller according to claim 1, wherein said stabilizing side section includes first and second portions, with the first portion extending rearwardly and downwardly from the front legs when the frame is in the operating configuration, with the second portion extending rearwardly and downwardly from the first portion when the frame is in the operating configuration, and with the second portion having a greater downward angle than the first portion when the frame is in the operating configuration.

7. A foldable baby stroller, comprising, in combination:

a) a frame comprising a leg portion and a handle portion;

b) wherein the leg portion of the frame comprises a pair of front legs and a pair of rear legs, with each of the legs comprising a proximal end portion and a distal end portion, with each of the legs further comprising a roller engaged to said distal end portion;

c) wherein the leg portion of the frame and handle portion of the frame are swingable relative to each other, with the frame having an operating configuration where the leg portion of the frame and the handle portion of the frame are swung apart, with the frame having a collapsed configuration where the leg portion of the frame and handle portion of the frame are swung to confront each other;

d) wherein each of the legs from their respective distal end portions to their respective proximal end portions is curved in one direction;

e) wherein the leg portion of the frame further comprises a pair of stabilizing side sections, with each of the stabilizing side sections running on one side of the frame between respective front and rear legs, with said stabilizing side section being swingably engaged to said front leg at a position closer to the proximal end portion of said front leg than the distal end portion of said front leg, with the stabilizing side section being swingably engaged to said rear leg at a position closer to the distal end portion of said rear leg than the proximal end portion of said rear leg; and f) wherein the frame further comprises a pair of seat support portions, with each of the seat support portions being swingably engaged to one of the stabilizing side sections at a position between the front and rear legs.

8. The baby stroller according to claim 7 wherein, when the frame is swung into the collapsed configuration, the front and rear legs lie generally parallel to each other.

9. The baby stroller according to claim 7 and further comprising a seat, with the seat being engaged to both the stabilizing side sections and the seat support portions of the frame.

10. The baby stroller according to claim 7 and further comprising a flexible receptacle, with the flexible receptacle being engaged to and depending from the stabilizing side sections.

11. A foldable baby stroller, comprising, in combination:

a) a frame comprising a leg portion and a handle portion;

b) wherein the leg portion of the frame comprises a pair of front legs and a pair of rear legs, with each of the legs comprising a proximal end portion and a distal end portion, with each of the legs further comprising a roller engaged to said distal end portion;

c) wherein the leg portion of the frame and handle portion of the frame are swingable relative to each other, with the frame having an operating configuration where the leg portion of the frame and the handle portion of the frame are swung apart, with the frame having a collapsed configuration where the leg portion of the frame and handle portion of the frame are swung to confront each other;

d) a pair of connectors between the leg portion of the frame and the handle portion of the frame for connecting the leg portion of the frame to the handle portion of the frame, with one of the connectors being on one side of the frame and the other connector being on the other side of the frame, with each of the connectors having a trigger for releasing the leg portion of the frame relative to the handle portion of the frame, with said trigger being activated for release by pressure being applied thereto in a generally upward direction;

e) wherein, when the trigger is activated, the handle portion of the frame and the leg portion of the frame are swingable naturally by gravity toward each other to confront each other; and f) wherein each of the connectors includes a slot of sufficient size to receive a hand of an adult, with the trigger located in the slot and further located in a portion of the slot that is proximal to the leg portion of the frame.

12. The foldable baby stroller according to claim 11 wherein the leg portion of the frame and the handle portion of the frame swing at a pivot, and wherein the trigger is adjacent to such pivot.

13. The foldable baby stroller according to claim 11 wherein each of the legs curve in one direction from said distal end portion to the proximal end portion, wherein the handle portion of the frame comprises a pair of side elongate sections which curve in one direction, and wherein each of the front legs curves along generally a same line as one of the side elongate sections to provide a smooth transition from the leg portion of the frame to the handle portion of the frame.

14. The foldable baby stroller according to claim 13 wherein the leg portion of the frame further comprises a pair of stabilizing side sections, with each of the stabilizing side sections being on one side of the frame and running to and between one front leg and one rear leg, with each of the stabilizing side sections being swingably engaged to one front leg at a position closer to the proximal end portion than said distal end portion of said front leg, with each of the stabilizing side sections being swingably engaged to one rear leg at a position closer to the distal end portion than the proximal end portion of said rear leg.

15. The foldable baby stroller according to claim 14 wherein the trigger includes a trigger surface, with the trigger surface being an under surface against which pressure is applied in the general upward direction.

16. The foldable baby stroller according to claim 15 wherein the under surface is inwardly rounded.

* * * * *